US008555939B2

(12) United States Patent
Hada

(10) Patent No.: US 8,555,939 B2
(45) Date of Patent: Oct. 15, 2013

(54) PNEUMATIC TIRE WITH TREAD HAVING CROWN CIRCUMFERENTIAL GROOVES AND MIDDLE CIRCUMFERENTIAL GROOVES

(75) Inventor: Yoshihiro Hada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 792 days.

(21) Appl. No.: 12/775,870

(22) Filed: May 7, 2010

(65) Prior Publication Data

US 2010/0314012 A1    Dec. 16, 2010

(30) Foreign Application Priority Data

Jun. 10, 2009    (JP) ................... 2009-139442

(51) Int. Cl.
*B60C 11/04*    (2006.01)
*B60C 11/12*    (2006.01)

(52) U.S. Cl.
USPC .. 152/209.18; 152/900; 152/901; 152/DIG. 3

(58) Field of Classification Search
USPC .................. 152/209.18, 900, 901, DIG. 3
See application file for complete search history.

(56) References Cited

U.S. PATENT DOCUMENTS

| | | | | | |
|---|---|---|---|---|---|
| 2,272,879 | A | * | 2/1942 | Hargraves | 152/901 |
| 4,244,415 | A | * | 1/1981 | Peter et al. | 152/209.26 |
| 5,373,882 | A | * | 12/1994 | Nakagawa | 152/209.28 |
| 5,909,756 | A | * | 6/1999 | Miyazaki | 152/209.18 |
| 2003/0192634 | A1 | * | 10/2003 | Hino | 152/209.18 |

FOREIGN PATENT DOCUMENTS

| | | | |
|---|---|---|---|
| EP | 1 961 587 A1 | | 8/2008 |
| JP | 01-282005 A | * | 11/1989 |
| JP | 05-169918 A | * | 7/1993 |
| JP | 06-106915 A | * | 4/1994 |
| JP | 11-123909 A | * | 5/1999 |
| JP | 2003-72321 A | | 3/2003 |

OTHER PUBLICATIONS

Machine translation for Japan 11-123909 (no date).*
Machine translation for Japan 06-106915 (no date).*
Machine translation for Japan 05-169918 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire 1 having excellent on-snow performances improved with maintaining steering stability and uneven wear resistance and including tread portion 2 having a pair of crown circumferential grooves 3 which extend continuously in the tire circumferential direction on both sides of tire equator C and have groove edges, one edge 3m extending in such a zigzag form that italic L-shaped groove edge segments 3s are continuously connected to each other in the circumferential direction, and the other edge 3n extending in such a wavy form that circular arc groove edge segments 3o each having a circular arc shape convex toward a groove center are continuously connected to each other in the circumferential direction, wherein each of the italic L-shaped groove edge segments 3s comprises long side part 3c inclined at an angle of 1 to 20° with respect to the circumferential direction, and short side part 3t having a circumferential length smaller than that of the long side part 3c and inclined in the opposite direction to the long side part 3c with respect to the circumferential direction.

10 Claims, 7 Drawing Sheets

PNEUMATIC TIRE WITH TREAD HAVING CROWN CIRCUMFERENTIAL GROOVES AND MIDDLE CIRCUMFERENTIAL GROOVES

BACKGROUND OF THE INVENTION

The present invention relates to a pneumatic tire having excellent on-snow performances improved with maintaining steering stability and uneven wear resistance.

It is well known that, in order to improve on-snow performances (i.e., running performances on snow-covered roads), circumferential main grooves extending continuously in the circumferential direction of tire are formed into a bent form to thereby enhance an effect of shearing a snow column. For example, JP-A-2003-072321 discloses a pneumatic tire comprising a tread portion having a zigzag-shaped center rib, a pair of center main grooves located on both sides of the center rib, i.e., center main grooves having a zigzag edge, and a pair of shoulder main grooves having a zigzag edge. It is also known that, in order to improve a steering stability on an icy road, a large number of sipes are formed in blocks to thereby increase an edge component.

However, formation of a large number of sipes or formation of sipes of full open type that both ends of a sipe are connected to the main grooves lowers a block rigidity and accordingly is easy to bring about deterioration of steering stability or uneven wear on dry roads.

Accordingly, it is an object of the present invention to provide a pneumatic tire capable of exhibiting improved on-snow performances while maintaining the steering stability and suppressing occurrence of uneven wear.

This and other objects of the present invention will become apparent from the description hereinafter.

SUMMARY OF THE INVENTION

The present invention is directed to a pneumatic tire having in a tread surface a pair of crown circumferential grooves each having such a shape that one of groove edges extends in a zigzag form that groove edge segments each having an italic L-shape (an italic capital L-like shape) are continuously connected to each other in a circumferential direction of tire, and the other groove edge extends in such a form that groove edge segments each having a circular arc convex toward a groove center are continuously connected to each other in the circumferential direction of tire.

In accordance with the present invention, there is provided a pneumatic tire including a tread portion having a pair of crown circumferential grooves extending continuously in a circumferential direction of tire on both sides of a tire equator and having groove edges, one of the groove edges of each of the crown circumferential grooves extending in such a zigzag form that italic L-shaped groove edge segments are continuously connected to each other in the circumferential direction of tire, and the other groove edge extending in such a wavy form that circular arc groove edge segments each having a circular arc shape convex toward a groove center are continuously connected to each other in the circumferential direction of tire, wherein each of the italic L-shaped groove edge segments comprises a long side part inclined at an angle of 1 to 20° with respect to the circumferential direction, and a short side part having a circumferential length smaller than that of the long side part and inclined in the opposite direction to the long side part with respect to the circumferential direction.

The zigzag edge mentioned above may be an axially inner edge or an axially outer edge of the crown circumferential groove, and the wavy edge mentioned above may be an axially outer edge or an axially inner edge of the groove. Preferably, the short side part of the italic L-shaped groove edge segment extends from one end of the long side part thereof in a direction opposite to the long side part with respect to an axial direction of the tire. Preferably, a circumferential pitch length of the italic L-shaped groove edge segment is smaller than a circumferential pitch length of the circular arc groove edge segment. A first slot may be formed at an approximately middle part of each of the italic L-shaped groove edge segments, and a second slot may be further formed at a location opposing the first slot in each of the circular arc groove edge segments. A pair of middle circumferential grooves extending continuously in the circumferential direction of tire may be formed axially outward of the crown circumferential grooves to provide a crown land portion extending continuously in the circumferential direction between the crown circumferential grooves, middle land portions each defined by the crown circumferential groove and the middle circumferential groove, and shoulder land portions each defined by the middle circumferential groove and a ground contact edge. Preferably, the middle circumferential grooves have groove edges such that an edge on the tire equator side extends straight in the circumferential direction, and an edge on the ground contact edge side extends in the circumferential direction in a zigzag form. Slots and/or sipes may be formed in the middle land portions, and lug grooves may be formed in the shoulder land portions.

Since the crown circumferential grooves have a zigzag edge comprising the italic L-shaped segments mentioned above on one side, for example, on an axially inner side, and a wave-like edge comprising the circular arc segments mentioned above on the other side, for example, on an axially outer side, a narrow portion and a wide portion are repeatedly formed in each crown circumferential groove. Therefore, a good snow-expelling performance is achieved by the wide groove portions to improve the on-snow performances and, on the other hand, a block rigidity is secured by the narrow groove portions, whereby marked lowering of steering stability and occurrence of uneven wear on dry roads can be prevented.

DETAILED DESCRIPTION OF THE INVENTION

An embodiment of the present invention will now be explained with reference to the accompanying drawings.

Figure 1:
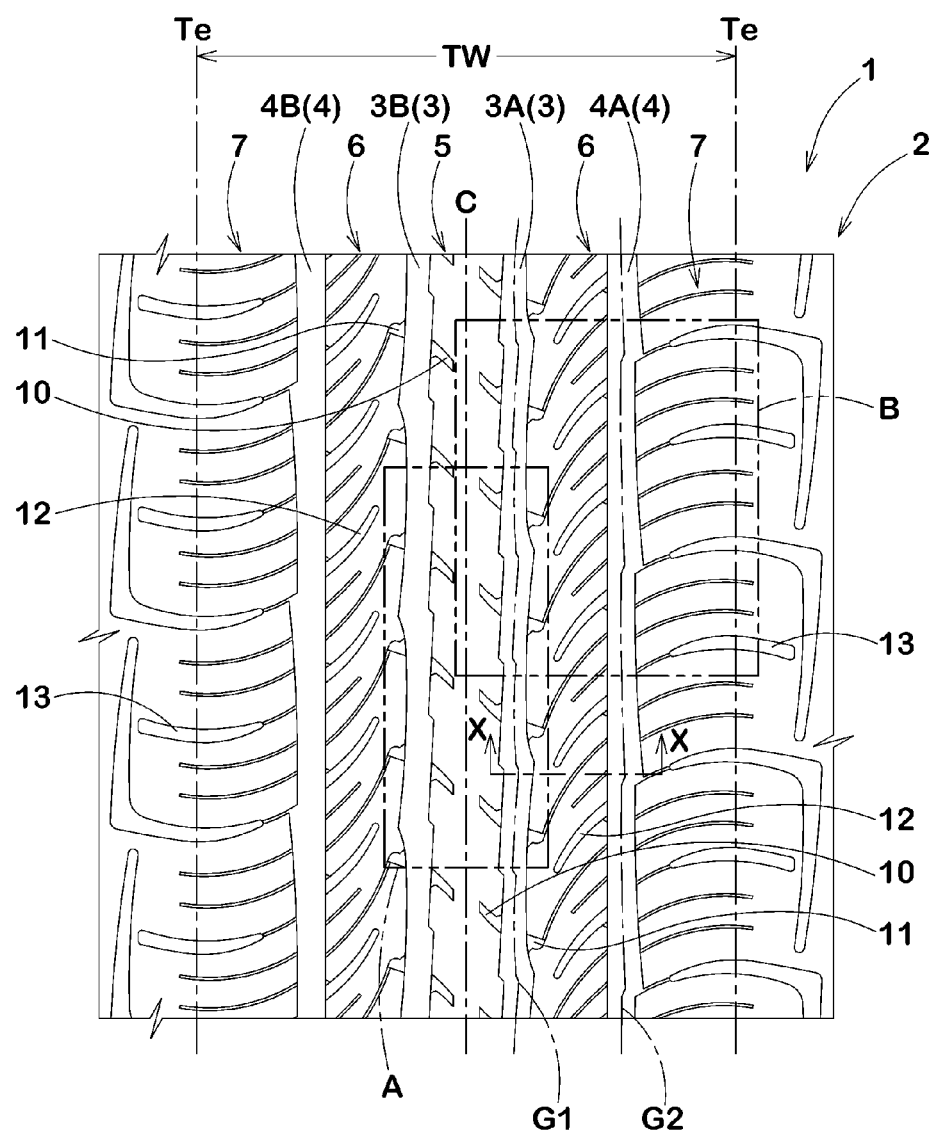
FIG. 1 is a development view of a tread portion of a pneumatic tire illustrating an embodiment of the present invention.
Figure 2:
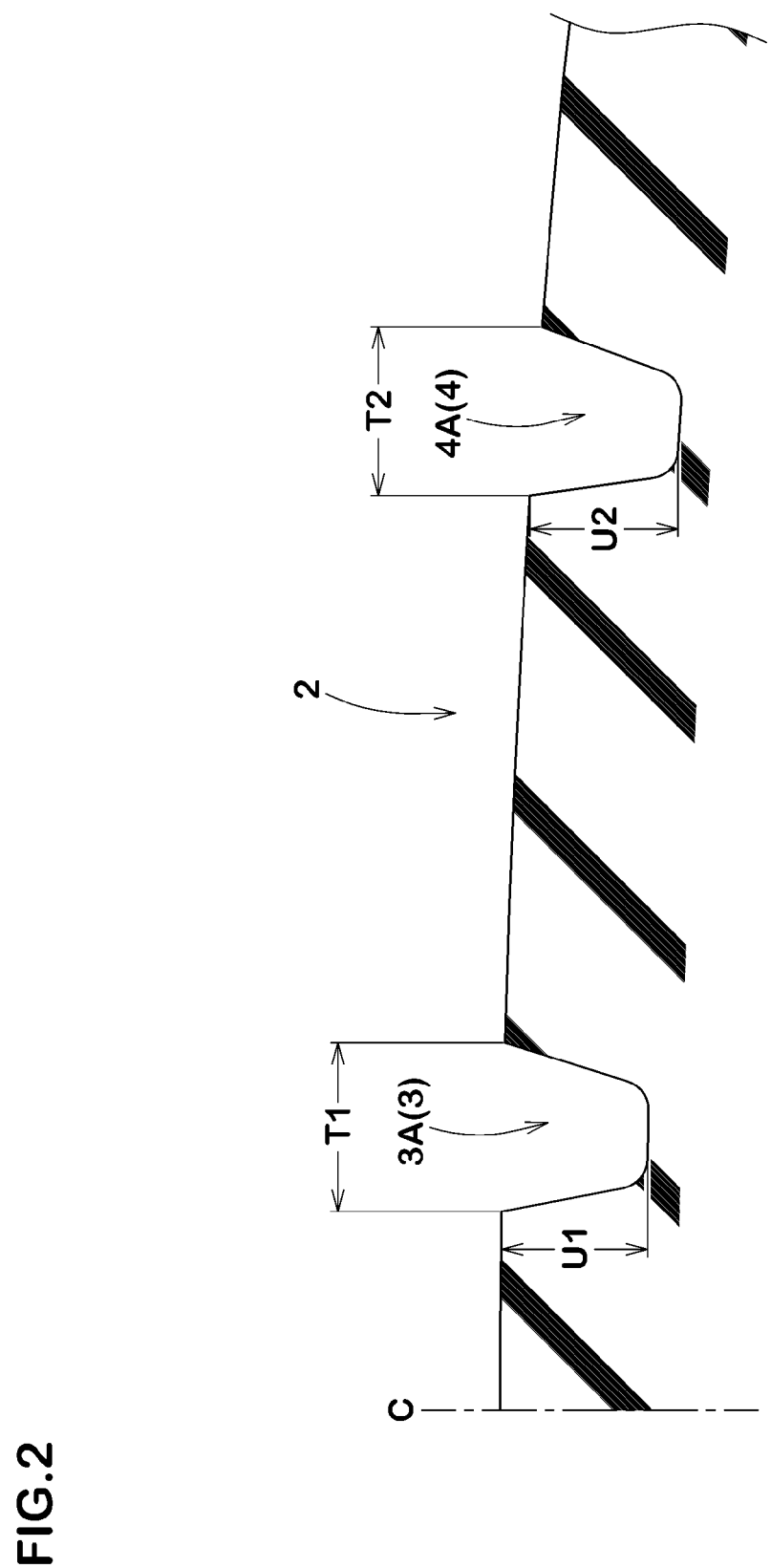
FIG. 2 is a cross sectional view taken on line X-X in FIG. 1.

Referring to FIGS. 1 and 2, pneumatic tire 1 in this embodiment can be suitably used, for example, as a radial tire for passenger cars. A tread portion 2 of the pneumatic tire 1 is provided with a pair of crown circumferential grooves 3 disposed on both sides of a tire equator C and extending continuously in the circumferential direction of tire, and a pair of middle circumferential grooves 4 disposed axially outward of the crown circumferential grooves 3 and extending continuously in the circumferential direction.

As shown in FIG. 1, the tread portion 2 includes a crown land portion 5 extending continuously in the circumferential direction between the crown circumferential grooves 3A and 3B, middle land portions 6 located between each of the crown circumferential grooves 3 and each of the middle circumferential grooves 4, and shoulder land portions 7 located axially outward of the middle circumferential grooves 4.

FIG. 2 shows a cross section of crown circumferential groove 3 and middle circumferential groove 4. From the viewpoint of maintaining the rigidity of the crown land portion 5 while securing a sufficient water or snow expelling performance, it is preferable that axial groove width T1 of the crown circumferential grooves 3 is 6.0 to 9.0% of a tread ground contact width TW. Similarly, it is preferable that axial groove width T2 of the middle circumferential grooves 4 is 5.0 to 7.0% of the tread ground contact width TW. In particular, when the groove width T1 of the crown grooves 3 is larger than the groove width T2 of the middle grooves 4, anti-hydroplaning performance is further improved since the drainage property of a region near the tire equator C at which the ground contact pressure is the highest is enhanced.

The term "tread ground contact width TW" as used herein means an axial distance between ground contact edges Te, Te of the tread portion 2 of a tire that contacts a flat surface when the tire is mounted on a normal rim and inflated to a normal inner pressure and the tire in such a standard state is then loaded with a normal load. By the way, dimensions of respective parts or portions of the tire denote values measured in the standard state mentioned above, unless otherwise noted.

The term "normal rim" as used herein means a rim defined for every tire in a standardizing system on which the tire is based and, for example, denotes "standard rim" in JATMA, "design rim" in TRA and "measuring rim" in ETRTO. Also, the term "normal inner pressure" as used herein means an air pressure defined for every tire in a standardizing system and, for example, denotes "maximum air pressure" in JATMA, a maximum value recited in the table of "Tire Load Limits at Various Cold Inflation Pressures" in TRA, and "Inflation Pressure" in ETRTO, provided that in case of tires for passenger cars, the "normal inner pressure" is 180 kPa. Further, the term "normal load" denotes a load defined for every tire in the standardizing system and is, for example, "maximum load capacity" in JATMA, a maximum value recited in the table of "Tire Load Limits at Various Cold Inflation Pressures" in TRA, and "Load Capacity" in ETRTO, provided that in case of tires for passenger cars, the "normal load" is a load of 88% of the load defined above.

It is desirable to enhance the snow-expelling performance and the drainage performance at the crown land portion 5 at which the ground contact pressure is the highest. It is also desirable to enhance a heat releasing effect at the crown land portion 5, since heat generation in running is large there and abnormal wear is easy to occur owing to thermal deterioration of rubber. Therefore, it is preferable that groove depth U1 of the crown circumferential grooves 3 is at least 6 mm, especially at least 7 mm, and is at most 11 mm, especially at most 10 mm.

Preferably, groove depth U2 of the middle circumferential grooves 4 is smaller than the groove depth U1 of the crown circumferential grooves 3, since the ground contact pressure of the middle and shoulder land portions 6 and 7 is smaller than that of the crown land portion 5 and heat generation thereof is also smaller. From such viewpoints and from a viewpoint of balance in rigidity among middle land portion 6, shoulder land portion 7 and crown land portion 5, it is preferable that the groove depth U2 of the middle circumferential grooves 4 is at least 5.5 mm, especially at least 6.5 mm, and is at most 10.5 mm, especially at most 9.5 mm.

Figure 3:
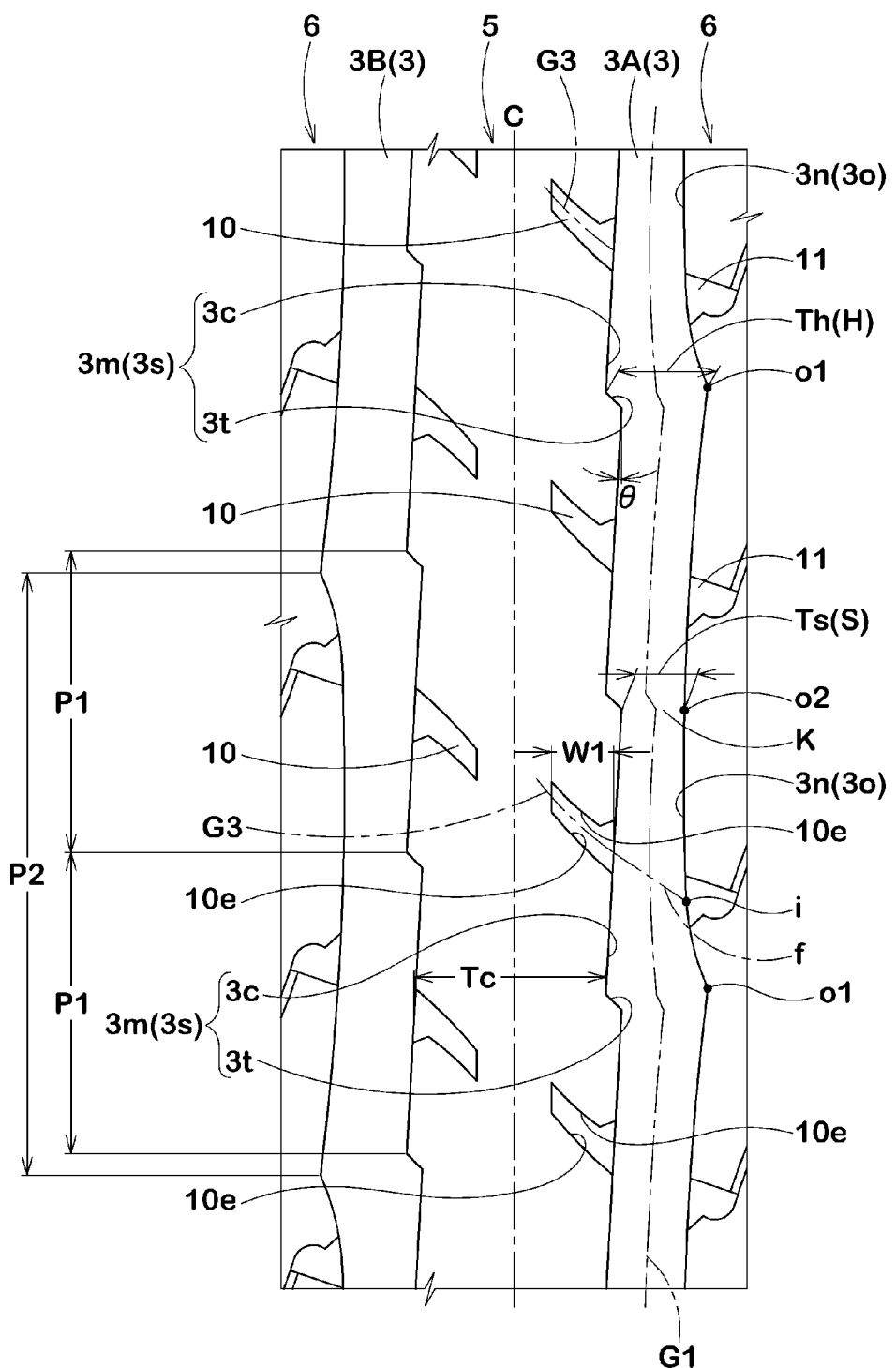
FIG. 3 is an enlarged development view of a portion A shown in FIG. 1.

FIG. 3 shows a part of a pair of the crown circumferential grooves 3A and 3B in an enlarged form. A groove edge on one side of the crown circumferential groove 3 is formed into such a zigzag form that italic L-shaped groove edge segments 3s are continuously connected to each other in the circumferential direction of tire, in which each of the italic L-shaped groove edge segments comprises a first long side part 3c inclined on one side at an angle θ larger than 0° with respect to the circumferential direction of tire, and a first short side part 3t having a circumferential length smaller than that of the long side part 3c and inclined in the opposite direction to the long side part with respect to the circumferential direction. In this embodiment shown in the drawings, a groove edge 3m located on the tire equator C side is formed into such a zigzag edge by repetition of the italic L-shaped groove edge segment. A groove edge on the other side of the crown circumferential groove 3 is formed into such a wavy form that circular arc groove edge segments 3o each having a circular arc shape convex toward a groove center of the crown circumferential groove 3 are continuously connected to each other in the circumferential direction of tire. In this embodiment shown in the drawings, a groove edge 3n located on the ground contact edge Te side is formed into such a wavy edge by repetition of the circular arc groove edge segment.

The groove width T1 of such a crown circumferential groove 3 varies continuously based on difference in shape between the groove edge 3m on one side and the groove edge 3n on the other side. That is, a widest groove part H at which the groove width T1 reaches a maximum and a narrowest groove part S at which the width T1 reaches a minimum are repeatedly formed in the circumferential direction. The crown circumferential grooves 3 having such a shape serve to enhance the on-snow performances, since they effectively cake snow therein and exhibit a large force of sharing the caked snow column.

If the inclination angle θ of the long side part 3c of the zigzag edge 3m is small, the zigzag edge 3m approaches a straight edge and the snow column shearing force tends to lower. On the other hand, if the inclination angle θ is too large, uneven wear tends to easily generate at the crown land portion 5. From such points of view, it is preferable that the inclination angle θ is at least 1.0°, especially at least 1.5°, more especially at least 2.0°, and is at most 20°, especially at most 15°, more especially at most 8°.

Figure 4A:
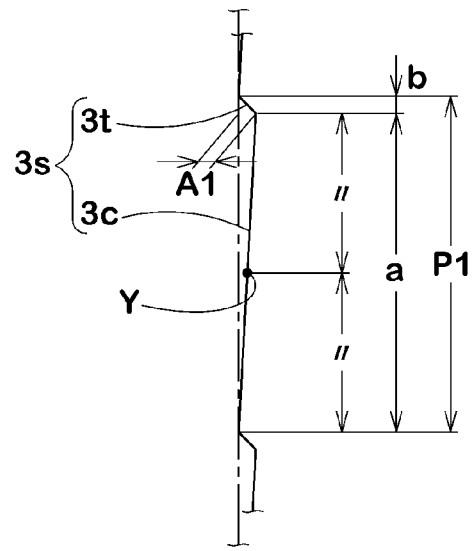
FIG. 4A is a partially enlarged view of a groove edge 3m on one side shown in FIG. 3.

FIG. 4A shows a partially enlarged view of the zigzag groove edge 3m. The long side part 3c is formed to have an axial length "a" larger than an axial length "b" of the short side part 3t. If a ratio a/b is too small, degree of change in rigidity of the crown land portion 5 is large, so uneven wear tends to easily occur. If the ratio a/b is too large, the edge effect of the short side part 3t is small in a limited amplitude A1 and the edge 3m approaches a straight edge, so the snow column shearing effect tends to lower. From such points of view, it is preferable that the ratio a/b is at least 5, especially at least 8, and is at most 20, especially at most 15.

Further, in this embodiment, the italic L-shaped groove edge segments 3s are formed to have a circumferential pitch length P1 smaller than a circumferential pitch length P2 of the circular arc groove edge segments 3o, as shown in FIG. 3. Thus, the short side parts 3t of the italic L-shaped groove edge segments 3s are formed at locations where the groove width suddenly changes, such as wide groove portions and/or narrow groove portions, of the crown circumferential grooves 3, whereby the snow-expelling performance can be further enhanced, since the edge components of the short side parts 3t are effectively utilized.

It is preferable that a ratio P2/P1 is at least 1.5, especially at least 1.8, and is at most 2.5, especially at most 2.2. In this embodiment shown in the drawings, the pitch length ratio P2/P1 is 2. Preferably, the short side parts 3t of the italic L-shaped groove edge segments 3s are formed at locations axially opposite to concave parts o1 which are both ends of each of the circular arc groove edge segments 3o and/or axially inwardly convex parts o2 at which a circular arc groove edge segment 3o bulges most inwardly in the axial direction, whereby a difference in groove width between the maximum groove width parts H and the minimum groove width parts S becomes large so that the crown circumferential grooves 3 have a zigzag shape. Thus, the snow column-shearing force of the crown grooves 3 is further enhanced.

Figure 4B:
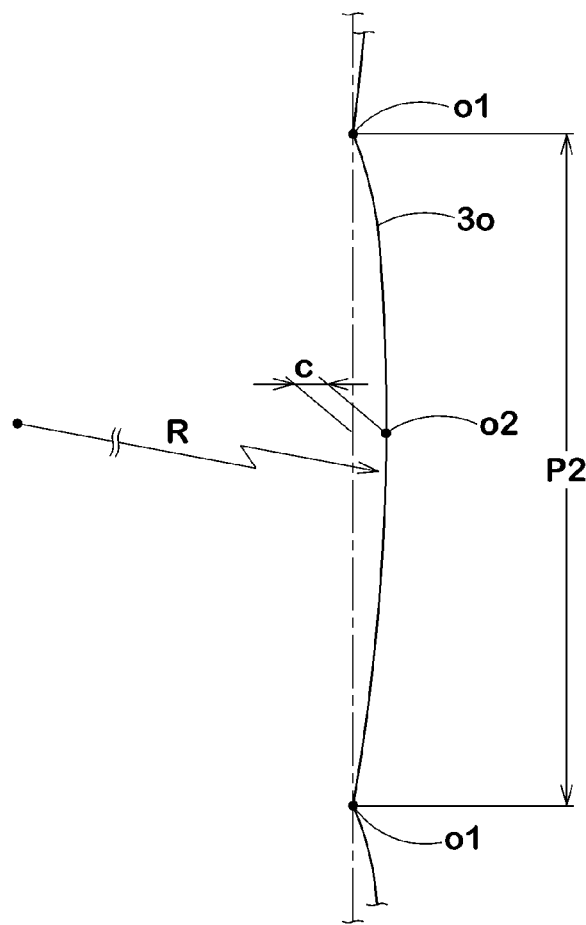
FIG. 4B is a partially enlarged view of a groove edge 3n on the other side shown in FIG. 3.

FIG. 4B shows a partially enlarged view of the wavy groove edge 3n. If a ratio c/R of an axial distance "c" between the concave part o1 and the convex part o2 to a radius of curvature "R" of the circular arc groove edge segment 3o is too large, a rigidity difference in the crown land portion 5 becomes large, so uneven wear tends to easily occur. If the ratio c/R is too small, the edge 3n approaches a straight edge, so a sufficient edge effect is not obtained and the snow column shearing effect tends to lower. From such points of view, it is preferable that the ratio c/R is at least 0.0013, especially at least 0.0026, and is at most 0.028, especially at most 0.023. For the same reasons as above, it is also preferable that the radius of curvature "R" is at least 125 mm, especially at least 150 mm, and is at most 425 mm, especially at most 390 mm.

When the short side parts 3t of the zigzag edge 3m are formed at locations opposite to the convex parts o2 of the wavy edge 3n as shown in FIG. 3, width-suddenly changing parts K are formed thereby at the minimum groove width parts S. Thus, since wide groove parts are formed near the minimum groove width parts S at which the snow-expelling performance tends to lower because of small width, the snow-expelling performance is secured and accordingly the on-snow performance is enhanced.

If the groove width at the minimum groove width parts S is too small, the snow-expelling performance tends to lower, and if the groove width at the maximum groove width parts H is too large, the rigidity of the crown land portion 5 tends to lower and accordingly uneven wear tends to easily occur. From such points of view, it is preferable that a ratio Th/Ts of groove width Th at the maximum groove width parts H to groove width Ts at the minimum groove width parts S is at least 1.3, especially at least 1.4, and is at most 1.8, especially at most 1.7.

The crown circumferential grooves 3 are formed into a zigzag shape as a whole. That is to say, center line G1 of the groove 3 is in the form of a zigzag. Since such a zigzag groove has a longer groove edge than a straight groove, it is desirable for enhancing a grip on an icy road, particularly a grip during cornering, that the amplitude A1 of the zigzag edge is large. On the other hand, if the amplitude A1 is too large, the rigidity of the crown land portion 5 tends to lower. From such points of view, it is preferable, as shown in FIGS. 3 and 4A, that a ratio A1/Th (%) of the amplitude A1 of peak-to-peak in the axial direction to the groove width Th at the maximum groove width parts H is at least 8%, especially at least 10%, and is at most 22%, especially at most 20%.

In this embodiment has been explained a crown circumferential groove 3 having a zigzag groove edge 3m on the tire equator C side and a wavy groove edge 3n on the ground contact edge Te side, but it goes without saying that a wavy groove edge 3n may be formed on the tire equator C side and a zigzag groove edge 3m may be formed on the ground contact edge Te side and the same effects can be expected by such a crown circumferential groove. When a zigzag groove edge 3m is formed on the tire equator C side, a large edge component in a traction direction can be secured in the crown land portion 5 at which the ground contact pressure is the highest, whereby a grip force on icy roads is enhanced as well as enhancement of the snow column-shearing force on snow-covered roads to improve the steering stability on icy and snow-covered roads. Therefore, it is preferable to form the zigzag groove edge 3m on the tire equator side.

Further, as shown in FIG. 3, a narrow first slot 10 may be formed at each italic L-shaped groove edge segment 3s of a crown circumferential groove 3A or 3B so that one end of the slot 10 is connected to an approximately middle portion of the first long side part 3c of the edge segment 3s and the other end of the slot 10 terminates without reaching the opposing zigzag edge of the other crown circumferential groove 3B or 3A located on the opposite side with respect to the tire equator C. The term "slot" as used herein means such a narrow groove that one end thereof terminates in a land portion and the axial length thereof is small. The slot is useful for optimizing a rigidity balance of a land portion. Since an edge component based on groove edges 10e formed in the circumferential direction of tire is added to the tread surface by the first slots 10, the snow column-shearing force at the crown land portion 5 is further enhanced. The "approximately middle portion" of the first long side part 3c of the edge segment 3s denotes a region of 30% of the circumferential length "a" of the long side part 3c, the region being centered at a midpoint Y of the length "a", in other words, a region extending from the midpoint Y toward circumferentially both sides up to 15% of the length "a".

If axial length W1 of the first slots 10 is too large, the rigidity of the crown land portion 5 tends to lower and accordingly uneven wear tends to easily occur. On the other hand, if the axial length W1 is too small, sufficient enhancement of the snow column-shearing force is not expected. From such points of view, it is preferable that a ratio W1/Tc (%) of the axial length W1 of the slots 10 to an axial width Tc of the crown land portion 5 is at least 32%, especially at least 35%, and is at most 43%, especially at most 40%.

Further, as shown in FIG. 3, second slots 11 facing the first slots 10 may be formed in the circular arc groove edge segments 3o of the crown circumferential groove 3 so that, preferably, an approximately cross-shaped intersection part is formed by the first slot 10, the second slot 11 and the crown circumferential groove 3 when viewed from above. Since an edge component of the second slot 11 is added to an edge component of the first slot 10 and since a cross-shaped snow column having a larger rigidity can be formed in the ground contact surface, a larger snow column-shearing force is obtained. The expression "second slots 11 facing the first slots 10" denotes such that each of the second slots 11 is formed to include an intersection point "i" of the circular arc edge segment 3o with an extended line "f" of a center line G3 of the first slot 10.

Preferably, as shown in FIGS. 1 and 3, grooves, sipes and other incisions are not formed in the crown land portion 5 except the first and second slots 10 and 11, since a large rigidity of the crown and middle land portions 5 and 6 is secured and, therefore, suppression of uneven wear and improvement of steering stability on a dry road are expected particularly at the crown land portion 5 at which the ground contact pressure is high.

Figure 5:
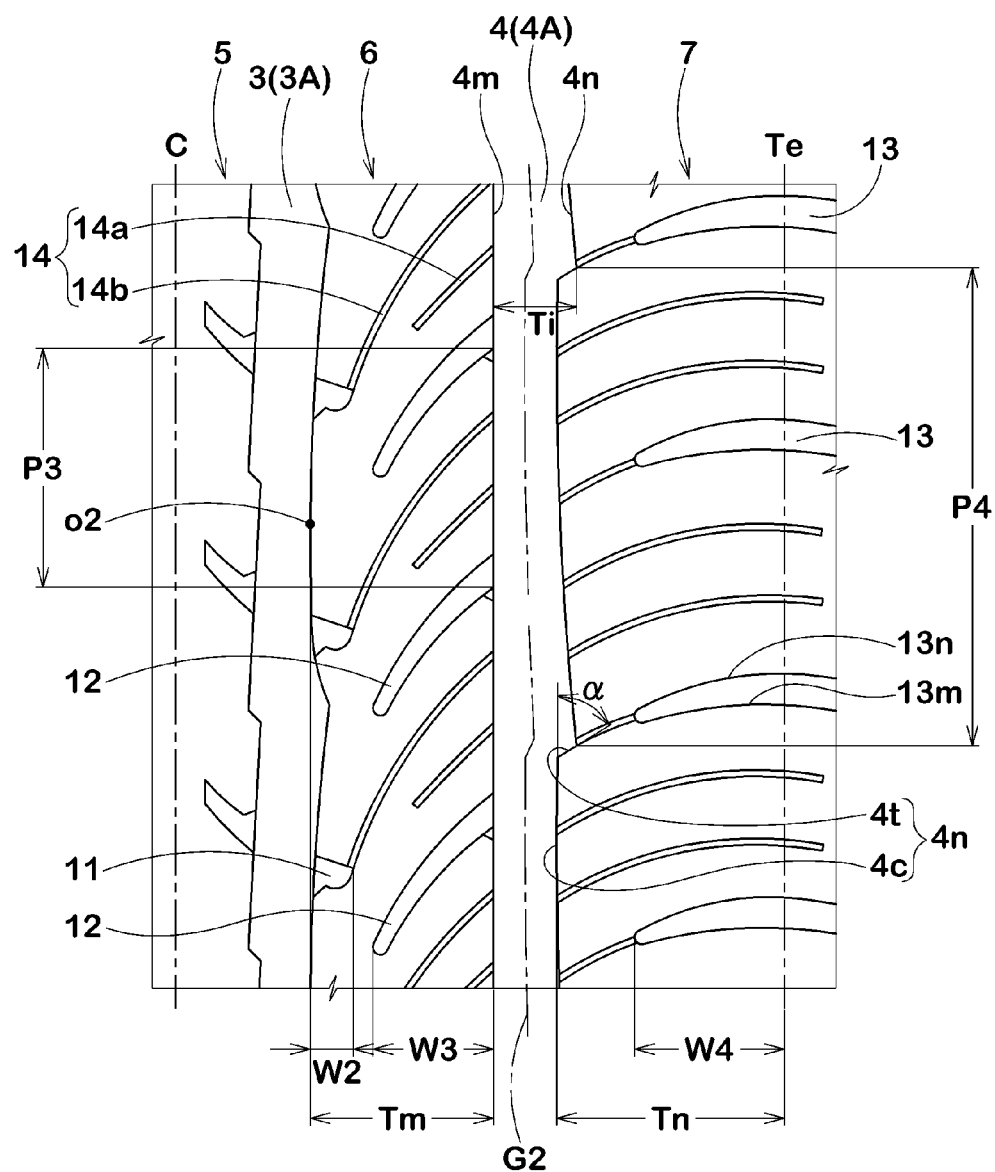
FIG. 5 is an enlarged development view of a portion B shown in FIG. 1.

FIG. 5 shows a part of the middle and shoulder land portions 6 and 7 in an enlarged form.

The middle circumferential grooves 4 have an edge 4$m$ extending straight in the circumferential direction on the tire equator C side. A groove edge 4$n$ on the ground contact edge Te side of the middle circumferential grooves 4 is formed into such a zigzag form that a second long side part 4$c$ inclined with respect to the circumferential direction and a second short side part 4$t$ having a circumferential length smaller than that of the long side part 4$c$ and inclined in the opposite direction to the long side part 4$c$ at an angle $\alpha$ with respect to the circumferential direction are alternately and continuously formed. Thus, the groove edge 4$n$ on the ground contact edge side extends in a zigzag form. Such middle circumferential grooves 4 serve to simultaneously enhance the snow-expelling performance and the snow column-shearing force as well as the crown circumferential grooves 3. In particular, since the groove edge 4$m$ on the tire equator side extends straight, it is possible to suppress a behavior such as staggering or sideslipping of a vehicle at the time of braking and accordingly a good steering stability can be secured.

Figure 6:
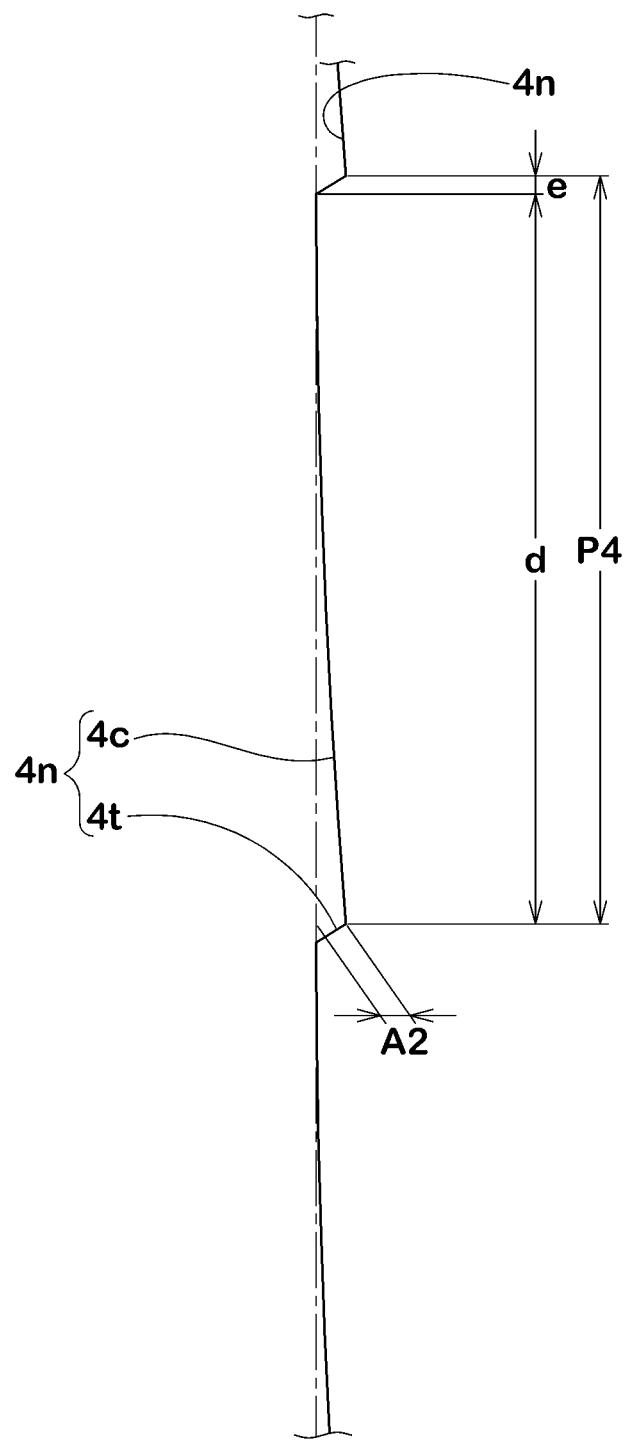
FIG. 6 is a partially enlarged view of a groove edge 4n on a ground contact edge Te side shown in FIG. 5.

As shown in FIGS. 5 and 6, the middle circumferential grooves 4 extend in the circumferential direction in a zigzag form as a whole. That is to say, center line G2 of the groove 4 is in the form of a zigzag. Since such a zigzag groove has a longer groove edge than a straight groove, it is desirable for enhancing a grip on an icy road, particularly a grip during cornering, that the amplitude A2 of the zigzag edge 4$n$ is large. On the other hand, if the amplitude A2 is too large, the rigidity of the shoulder land portion 7 tends to lower. From such points of view, it is preferable that a ratio A2/Ti (%) of the amplitude A2 to a maximum groove width Ti of the middle circumferential groove 4 is at least 15%, especially at least 18%, and is at most 30%, especially at most 27%.

If the inclination angle $\alpha$ of the short side part 4$t$ of the zigzag edge 4$n$ is small, the edge 4$n$ on the ground contact edge side approaches a straight line from a zigzag line and the snow column shearing force tends to lower since the edge effect is decreased. On the other hand, if the inclination angle $\alpha$ is too large, uneven wear tends to easily occur at the shoulder land portion 7 since a rigidity change becomes large. From such points of view, it is preferable that the inclination angle $\alpha$ is at least 45°, especially at least 50°, and is at most 80°, especially at most 75°.

Further, as shown in FIG. 6, the second long side part 4$c$ is formed to have an axial length "d" larger than an axial length "e" of the second short side part 4$t$. If a ratio d/e is too small, uneven wear tends to easily occur at the shoulder land portion 7. If the ratio d/e is too large, the groove edge 4$n$ on the ground contact edge Te side approaches a straight edge, so the snow column shearing effect tends to lower since the edge effect is decreased. From such a viewpoint and from a viewpoint of rigidity balance among the land portions 5, 6 and 7, it is preferable that the ratio d/e is at least 20, especially at least 25, and is at most 50, especially at most 45.

As shown in FIG. 5, middle slots 12 extending from the middle circumferential groove 4 toward the tire equator C and terminating without reaching the crown circumferential groove 3 may be formed in each middle land portion 6, whereby an edge component in the traction direction and a groove volume are kept large in the middle land portion 6 at which the ground contact pressure is relatively high, so the on-ice and snow performances are further enhanced.

A ratio P4/P3 of a circumferential pitch length P4 of the groove edge 4$n$ on the ground contact edge side to a circumferential pitch length P3 of the middle slots 12 is not particularly limited. However, if the ratio P4/P3 is too large, the middle circumferential groove 4 approaches a straight groove, so the snow column shearing force is decreased and the steering stability on a snow-covered road tends to lower. If the ratio P4/P3 is too small, the rigidity of the shoulder land portion 7 is decreased and uneven wear tends to easily occur. From such points of view, it is preferable that the ratio P4/P3 is at least 1.5, especially at least 1.8, and is at most 2.5, especially at most 2.2. In this embodiment shown in the drawings, the ratio P4/P3 is 2.

If axial length W3 of the middle slots 12 is too large, the rigidity of the middle land portion 6 is remarkably decreased, so uneven wear in an earlier stage and chipping of blocks tend to occur. On the other hand, if the axial length W3 is too small, a sufficient edge component cannot be secured. From such points of view, it is preferable that a sum (W3+W2) of the axial length W3 of the middle slot 12 and the axial length W2 of the second slot 11 is at least 60%, especially at least 65%, of an axial width Tm of the middle land portion 6, and is at most 85%, especially at most 80%, of the land width Tm.

Further, as shown in FIG. 5, two middle sipes 14 extending from the middle circumferential groove 4 toward the tire equator C may be formed between circumferentially adjacent middle slots 12, 12 in the middle land portion 6.

Two middle sipes 14 disposed in each region between the adjacent middle slots 12 comprise a first middle sipe 14$a$ having a smaller axial length and a second middle sipe 14$b$ having a longer axial length than the first sipe 14$a$. An axially inner end on the tire equator side of the first middle sipe 14$a$ terminates inside the middle land portion 6 without reaching the crown circumferential groove 3. An axially inner end on the tire equator side of the second middle sipe 14$b$ extends up to and is communicated with the second slot 11 disposed at the crown circumferential groove 3, whereby the edge component of the middle sipe 14 as a whole is increased while suppressing lowering of the rigidity of the middle land portion 6. Thus, the steering stability on dry roads and the on-ice performance can be improved in a balanced manner.

As shown in FIG. 5, the shoulder land portions 7 may be provided with shoulder lug grooves 13 which extend from the outside of the ground contact edge Te in the axial direction toward the tire equator C beyond the ground contact edge Te and which terminate without reaching the middle circumferential groove 4. The shoulder lug grooves 13 serve to smoothly discharge water on a snow-covered road or rain water to the outside of the ground contact edges Te, so the steering stability is further improved. On the other hand, if an axial length W4 of the shoulder lug grooves 13 is too large, a grip force in cornering on a dry road tends to decrease to lower the steering stability. From such points of view, it is preferable that a ratio W4/Tn (%) of the axial length W4 to an axial width Tn of the shoulder land portion 7 is at least 70%, especially at least 75%, and is at most 90%, especially at most 85%.

Although groove edges 13$m$ and 13$n$ of the shoulder lug grooves 13 may be chamfered, it is preferable that the groove edges 13$m$ and 13$n$ are not chamfered since such edges effectively function on an icy road and are more effective in suppressing lowering of the snow column-shearing force. The shoulder lug grooves 13 are disposed so that the inclination angle with respect to the circumferential direction is larger than that of the middle slots 12, whereby a grip force of the shoulder land portions 7 at which the ground contact pressure in cornering is high can be increased.

In the embodiment shown in the drawings, a right half tread pattern and a left half tread pattern are symmetrical about a point.

While a preferable embodiment of the present invention has been described with reference to the drawings, it goes without saying that the present invention is not limited to only such an embodiment and various changes and modifications may be made.

The present invention is more specifically described and explained by means of the following examples. It is to be understood that the present invention is not limited to these examples.

EXAMPLES

Radial tires for passenger cars having a size of 195/65R15 and a tread pattern shown in FIG. 1 were manufactured based on the specifications shown in Table 1. Other specifications of the tires are substantially common to all tires, and common specifications with respect to the tread pattern are shown below.

Tread ground contact width TW: 162 mm

Ratio T1/TW of crown circumferential groove width T1 to TW: 7.5%

Ratio T2/TW of middle circumferential groove width T2 to TW: 6%

Groove depth U1 of crown circumferential grooves: 9.5 mm

Groove depth U2 of middle circumferential grooves: 9.5 mm

Ratio c/R of axial distance "c" between concave part o1 and convex part o2 to radius of curvature "R" of circular arc edge segment 3o: 0.009

Ratio Th/Ts of groove width Th at maximum groove width parts H to groove width Ts at minimum groove width parts S: 1.62

Ratio P2/P1 of circumferential pitch length P2 of circular arc edge segments 3o to circumferential pitch length P1 of italic L-shaped edge segments 3s: 2

Ratio A1/Th of amplitude A1 of crown circumferential groove to groove width Th at maximum groove width parts H: 0.205

Ratio W1/Tc of axial length W1 of first slots 10 to axial width Tc of crown land portion 5: 0.33

Ratio A2/Ti of amplitude A2 of zigzag edge 4n to maximum groove width Ti of middle circumferential grooves 4: 0.23

Ratio d/e of axial length "d" of second long side part 4c to axial length "e" of second short side part 4t of zigzag edge 4n of middle circumferential grooves 4: 36

The tires were attached to a Japanese 3,500 cc four-wheel-drive car under a condition of inner pressure 200 kPa, and tested with respect to running performance on snow-covered road, steering stability and uneven wear resistance. Testing methods are as follows:

<Running Performance on Snow-Covered Road>

The test car mentioned above was run on a test course of a compressed snow-covered road, and performances such as steering wheel responsibility, feeling of rigidity and grip were evaluated by driver's feeling. The results are shown by an index based on a result of Comparative Example 1 regarded as 100. The lager the value, the better.

<Steering Stability>

The test car mentioned above was run on a test course of a dry asphalt road, and performances such as steering wheel responsibility, feeling of rigidity and grip were evaluated by driver's feeling. The results are shown by an index based on a result of Comparative Example 1 regarded as 100. The lager the value, the better.

<Uneven Wear Resistance>

The test car mentioned above was run 3,000 km on a dry asphalt road. With respect to the crown land portion and the middle land portion, a difference in amount of wear between axial one end and the other end of each land was measured at four locations in the circumferential direction, and the average value thereof was obtained for each land. The results are shown by an index of the reciprocal of the obtained average value based on a result of Comparative Example 1 regarded as 100. The larger the value, the better the uneven wear resistance.

The results are shown in Table 1.

It is observed in the table that the tires of the Examples according to the present invention have an improved running performance on snow-covered roads. It is also observed that the uneven wear resistance is acceptable.

TABLE 1

Figure 7A:
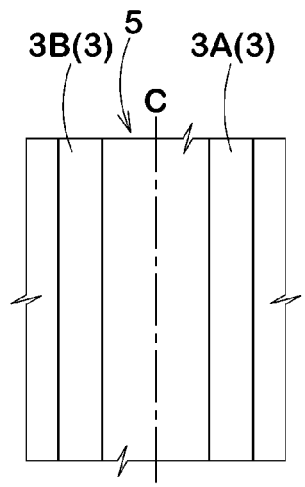
FIG. 7A is a development view showing a structure of a crown circumferential groove formed in Comparative Example 1 described after.
Figure 7B:
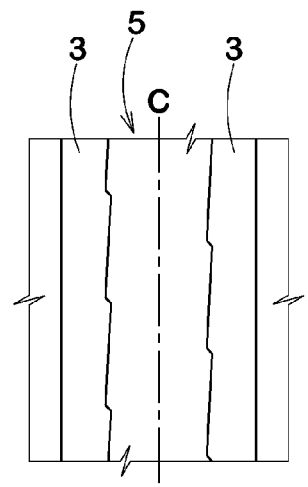
FIG. 7B is a development view showing a structure of a crown circumferential groove formed in Comparative Example 2 described after.

|  | Com. Ex. 1 | Com. Ex. 2 | Ex. 1 | Ex. 2 | Ex. 3 | Ex. 4 | Ex. 5 | Ex. 6 |
|---|---|---|---|---|---|---|---|---|
| Crown circumferential grooves |  |  |  |  |  |  |  |  |
| Shape | FIG. 7A | FIG. 7B | FIG. 3 | FIG. 3 | FIG. 3 | FIG. 3 | FIG. 3 | FIG. 3 |
| Angle θ of first long side part (°) | 0 | 5.0 | 1.0 | 3.0 | 5.0 | 10 | 5.0 | 5.0 |
| Ratio a/b of length of long side part to length of short side part | — | 10 | 10 | 10 | 10 | 10 | 5 | 20 |
| Amplitude A1 (mm) | — | 3 | 0.5 | 1.4 | 2.4 | 4.8 | 2.2 | 2.5 |
| Radius of curvature R (mm) | — | — | 300 | 300 | 300 | 300 | 300 | 300 |
| Distance "c" (mm) | — | — | 3 | 3 | 3 | 3 | 3 | 3 |
| Presence of first slots | no | no | no | no | no | no | no | no |
| Presence of second slots | no | no | no | no | no | no | no | no |
| Middle circumferential grooves |  |  |  |  |  |  |  |  |
| Angle α of second short side part (°) | 65 | 65 | 65 | 65 | 65 | 65 | 65 | 65 |
| Pitch ratio P4/P3 | 2 | 2 | 2 | 2 | 2 | 2 | 2 | 2 |

TABLE 1-continued

| Test results | | | | | | | | |
|---|---|---|---|---|---|---|---|---|
| Performance on snow-covered road | 100 | 101 | 102 | 105 | 107 | 108 | 103 | 102 |
| Steering stability | 100 | 100 | 100 | 100 | 100 | 98 | 98 | 99 |
| Uneven wear resistance | 100 | 100 | 100 | 100 | 99 | 95 | 99 | 100 |

| | Ex. 7 | Ex. 8 | Ex. 9 | Ex. 10 | Ex. 11 | Ex. 12 | Ex. 13 | Ex. 14 |
|---|---|---|---|---|---|---|---|---|
| Crown circumferential grooves | | | | | | | | |
| Shape | FIG. 3 | FIG. 3 | FIG. 3 | FIG. 3 | FIG. 3 | FIG. 3 | FIG. 3 | FIG. 3 |
| Angle θ of first long side part (°) | 5.0 | 5.0 | 5.0 | 5.0 | 5.0 | 5.0 | 5.0 | 5.0 |
| Ratio a/b of length of long side part to length of short side part | 10 | 10 | 10 | 10 | 10 | 10 | 10 | 10 |
| Amplitude A1 (mm) | 2.4 | 2.4 | 2.4 | 2.4 | 2.4 | 2.4 | 2.4 | 2.4 |
| Radius of curvature R (mm) | 300 | 300 | 300 | 300 | 100 | 200 | 400 | 500 |
| Distance "c" (mm) | 1 | 2 | 4 | 5 | 3 | 3 | 3 | 3 |
| Presence of first slots | no | no | no | no | no | no | no | no |
| Presence of second slots | no | no | no | no | no | no | no | no |
| Middle circumferential grooves | | | | | | | | |
| Angle α of second short side part (°) | 65 | 65 | 65 | 65 | 65 | 65 | 65 | 65 |
| Pitch ratio P4/P3 | 2 | 2 | 2 | 2 | 2 | 2 | 2 | 2 |
| Test results | | | | | | | | |
| Performance on snow-covered road | 103 | 107 | 110 | 113 | 105 | 104 | 105 | 105 |
| Steering stability | 100 | 100 | 98 | 98 | 100 | 100 | 100 | 98 |
| Uneven wear resistance | 100 | 100 | 98 | 95 | 99 | 99 | 99 | 99 |

Figure 7C:
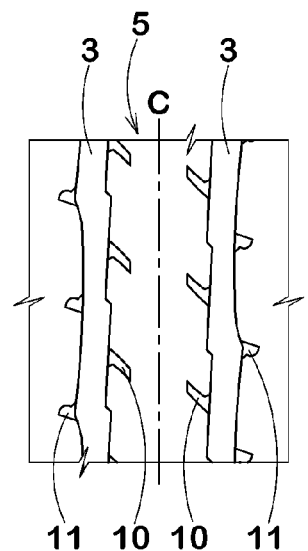
FIG. 7C is a development view showing another example of the crown circumferential groove according to the present invention.

| | Ex. 15 | Ex. 16 | Ex. 17 | Ex. 18 | Ex. 19 | Ex. 20 | Ex. 21 |
|---|---|---|---|---|---|---|---|
| Crown circumferential grooves | | | | | | | |
| Shape | FIG. 3 | FIG. 7C | FIG. 3 | FIG. 3 | FIG. 3 | FIG. 3 | FIG. 3 |
| Angle θ of first long side part (°) | 5.0 | 5.0 | 5.0 | 5.0 | 5.0 | 5.0 | 5.0 |
| Ratio a/b of length of long side part to length of short side part | 10 | 10 | 10 | 10 | 10 | 10 | 10 |
| Amplitude A1 (mm) | 2.4 | 2.4 | 2.4 | 2.4 | 2.4 | 2.4 | 2.4 |
| Radius of curvature R (mm) | 300 | 300 | 300 | 300 | 300 | 300 | 300 |
| Distance "c" (mm) | 3 | 3 | 3 | 3 | 3 | 3 | 3 |
| Presence of first slots | yes | yes | yes | yes | yes | yes | yes |
| Presence of second slots | no | yes | yes | yes | yes | yes | yes |
| Middle circumferential grooves | | | | | | | |
| Angle α of second short side part (°) | 65 | 65 | 65 | 45 | 80 | 65 | 65 |
| Pitch ratio P4/P3 | 2 | 2 | 2 | 2 | 2 | 1 | 3 |
| Test results | | | | | | | |
| Performance on snow-covered road | 108 | 108 | 110 | 105 | 110 | 112 | 102 |
| Steering stability | 100 | 100 | 100 | 100 | 100 | 98 | 100 |
| Uneven wear resistance | 98 | 98 | 100 | 100 | 95 | 95 | 100 |

*Shapes of middle and shoulder land portions are shown in FIG. 1.

What is claimed is:

1. A pneumatic tire including comprising
a tread portion provided with a pair of crown circumferential grooves extending continuously in a circumferential direction of the tire and disposed one on each side of the tire equator and
each said crown circumferential groove having two groove edges, wherein
one of said two groove edges extends in such a zigzag form that L-shaped groove edge segments are connected in succession in the circumferential direction of the tire, and
the other groove edge extends in such a wavy form that circular arc groove edge segments each having a circular arc shape convex toward a groove center line are connected in succession in the circumferential direction of the tire, wherein
each of said L-shaped groove edge segments comprises
a long part inclined at an angle of 1 to 20° with respect to the circumferential direction, and
a short part having a circumferential length smaller than that of said long part and inclined in the opposite direction to said long part with respect to the circumferential direction,
wherein
the tread portion is further provided with
a middle circumferential groove disposed axially outside each said crown circumferential groove,
the middle circumferential groove extending continuously in the circumferential direction and having an axially inner edge extending straight in the circumferential direction, and an axially outer edge extending zigzag in the circumferential direction,
a crown land portion extending continuously in the circumferential direction and define between said a pair of the crown circumferential grooves,
a pair of middle land portions each defined between said middle circumferential groove and the adjacent crown circumferential groove, and
a pair of shoulder land portions each defined between said middle circumferential groove and the adjacent ground contact edge of the tread portion.

2. The pneumatic tire of claim 1, wherein a circumferential pitch length of said L-shaped groove edge segments is smaller than a circumferential pitch length of said circular arc groove edge segments.

3. The pneumatic tire of claim 1, wherein a first slot is disposed at an approximately middle part of each of said L-shaped groove edge segments.

4. The pneumatic tire of claim 3, wherein a second slot is disposed at a location opposing said first slot in each of said circular arc groove edge segments.

5. The pneumatic tire of claim 4, wherein said crown land portion does not have any grooves, sipes and other incisions except said first and second slots.

6. The pneumatic tire of claim 1, wherein the middle land portions are provided with middle slots extending from said middle circumferential grooves toward the tire equator and terminating without reaching said crown circumferential grooves.

7. The pneumatic tire of claim 1, wherein the shoulder land portions are provided with shoulder lug grooves which extend from the outside of the ground contact edges in the axial direction toward the tire equator beyond the ground contact edges and which terminate without reaching said middle circumferential grooves.

8. The pneumatic tire of claim 6, wherein two middle sipes extending from the middle circumferential grooves toward the tire equator are disposed in each region between the circumferentially adjacent middle slots in the middle land portions.

9. The pneumatic tire of claim 8, wherein said two middle sipes are a first middle sipe and a second middle sipe, the second middle sipe having a longer axial length than that of said first middle sipe, and said first middle sipe terminates without reaching the crown circumferential groove.

10. The pneumatic tire of claim 8, wherein a first slot is disposed at an approximately middle part of each of said L-shaped groove edge segments, a second slot is disposed at a location opposing said first slot in each of said circular arc groove edge segments, and said two middle sipes are a first middle sipe and a second middle sipe, the second middle sipe having a longer axial length than that of said first middle sipe, and said second middle sipe extends to the second slot.

\* \* \* \* \*